(12) United States Patent
Tohma et al.

(10) Patent No.: US 8,383,534 B2
(45) Date of Patent: Feb. 26, 2013

(54) PROCESS FOR PRODUCING ALUMINUM MAGNESIUM TITANATE

(75) Inventors: Tetsuro Tohma, Niihama (JP); Keiichiro Suzuki, Niihama (JP); Satoko Iwato, Shibuya-ku (JP); Rina Yamanaka, Nagoya (JP)

(73) Assignees: Sumitomo Chemical Company, Limited, Tokyo (JP); E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/863,722

(22) PCT Filed: Jan. 19, 2009

(86) PCT No.: PCT/JP2009/050674
§ 371 (c)(1),
(2), (4) Date: Oct. 6, 2010

(87) PCT Pub. No.: WO2009/093547
PCT Pub. Date: Jul. 30, 2009

(65) Prior Publication Data
US 2011/0077143 A1 Mar. 31, 2011

(30) Foreign Application Priority Data
Jan. 21, 2008 (JP) ................................ 2008-010158

(51) Int. Cl.
*C04B 35/465* (2006.01)
(52) U.S. Cl. .................... 501/136; 423/71; 423/598
(58) Field of Classification Search .............. 501/136; 423/71, 598
See application file for complete search history.

(56) References Cited

U.S. PATENT DOCUMENTS

| | | | |
|---|---|---|---|
| 4,327,188 A | 4/1982 | Endo et al. | |
| 6,620,751 B1 | 9/2003 | Ogunwumi | |
| 7,011,788 B2 | 3/2006 | Fukuda et al. | |
| 7,166,552 B2 | 1/2007 | Fukuda et al. | |
| RE42,352 E * | 5/2011 | Fukuda et al. | 501/136 |
| 2003/0015829 A1 | 1/2003 | Fukuda et al. | |
| 2004/0092381 A1 | 5/2004 | Beall et al. | |
| 2005/0181929 A1 | 8/2005 | Fukuda et al. | |
| 2006/0009347 A1 | 1/2006 | Fukuda et al. | |
| 2007/0059484 A1 * | 3/2007 | Fukuda et al. | 428/116 |
| 2007/0224110 A1 * | 9/2007 | Fukuda et al. | 423/598 |
| 2010/0237007 A1 * | 9/2010 | Merkel et al. | 210/510.1 |
| 2010/0298114 A1 * | 11/2010 | Maki et al. | 501/136 |
| 2010/0310819 A1 | 12/2010 | Suwabe et al. | |
| 2010/0317508 A1 | 12/2010 | Maki et al. | |
| 2011/0077143 A1 * | 3/2011 | Tohma et al. | 501/136 |
| 2011/0097582 A1 * | 4/2011 | Tohma et al. | 428/402 |
| 2011/0124484 A1 * | 5/2011 | Maki et al. | 501/32 |
| 2011/0248106 A1 * | 10/2011 | Maki et al. | 241/25 |
| 2011/0287921 A1 * | 11/2011 | Uoe et al. | 501/32 |
| 2012/0003464 A1 * | 1/2012 | Uoe et al. | 428/310.5 |

FOREIGN PATENT DOCUMENTS

| | | |
|---|---|---|
| EP | 1514857 A1 | 3/2005 |
| EP | 2221287 A1 | 8/2010 |
| EP | 2239244 A1 | 10/2010 |
| JP | 11-060240 | 3/1999 |
| WO | 02/38519 A1 | 5/2002 |
| WO | 2004/039747 A1 | 5/2004 |

OTHER PUBLICATIONS

Liu, T.S. and Perera, D.S., "Long-term thermal stability and mechanical properties of aluminium titanate at 1000-1200 degrees C", Journal of Materials Science, vol. 33, 1998, pp. 995-1001.

L. Giordano, et al., "Microstructure and thermal expansion of $Al_2TiO_5$-$MgTi_2O_5$ solid solutions obtained by reaction sintering", Journal of the European Ceramic Society, 2002, pp. 1811-1822, vol. 22.

* cited by examiner

*Primary Examiner* — Karl Group
(74) *Attorney, Agent, or Firm* — Sughrue Mion, PLLC

(57) ABSTRACT

The invention is to provide a process capable of producing aluminium magnesium titanate having a small coefficient of thermal expansion at a firing temperature lower than 1500° C. The production process of the invention comprises maintaining a pre-mixture containing a titania source powder, an alumina source powder, a magnesia source powder and a silica source powder within a temperature range of from 1100° C. to 1350° C. for at least 3 hours, followed by heating up to a temperature not lower than 1400° C. and firing at the temperature. The silica source powder is preferably a powder of alkali feldspar. Aluminium magnesium titanate is prepared according to the production process of the invention, and the resulting aluminium magnesium titanate is ground to give an aluminium magnesium titanate powder.

1 Claim, No Drawings

PROCESS FOR PRODUCING ALUMINUM MAGNESIUM TITANATE

TECHNICAL FIELD

The present invention relates to a process for producing aluminium magnesium titanate, and precisely to a process for producing aluminium magnesium titanate by firing a pre-mixture containing a titania source powder, an alumina source powder, a magnesia source powder and a silica source powder.

BACKGROUND ART

Aluminium magnesium titanate is known as a ceramic excellent in heat resistance. Its production process is disclosed in Example 1 of Patent Reference 1 (W02004/039747, pp. 6-7). In Example 1, a pre-mixture containing a titania source powder, an alumina source powder, a magnesia source powder and a silica source powder is gradually heated up to 700° C., the temperature is kept for 3 hours, thereafter the pre-mixture is heated up to 1000° C. taking 26 hours, then further up to 1400° C. taking 2 hours, and fired at the temperature for hours. According to the process, the pre-mixture is maintained within a temperature range of from 1100° C. to 1350° C. for 1.8 hours in the heating process.

As a process for producing aluminium magnesium titanate, desired is a process capable of producing one having a small coefficient of thermal expansion. For producing aluminium magnesium titanate having a small coefficient of thermal expansion, the pre-mixture maybe fired at a higher temperature, for example, at a temperature not lower than 1500° C.

However, for industrial operation, the firing temperature is preferably lower.

DISCLOSURE OF THE INVENTION

Problems that the Invention is to Solve

Accordingly, the present inventors have diligently studied for developing a process capable of producing aluminium magnesium titanate having a small coefficient of thermal expansion, at a firing temperature lower than 1500° C., and, as a result, have reached the invention.

Means for Solving the Problems

Specifically, the invention provides a process for producing aluminium magnesium titanate, comprising maintaining a pre-mixture containing a titania source powder, an alumina source powder, a magnesia source powder and a silica source powder within a temperature range of from 1100° C. to 1350° C. for at least 3 hours, followed by heating up to a temperature not lower than 1400° C. and firing at the temperature.

Effect of the Invention

According to the production process of the invention, aluminium magnesium titanate having a small coefficient of thermal expansion can be produced at a firing temperature lower than 1500° C.

Mode for Carrying out the Invention

In the production process of the invention, a pre-mixture containing a titania source powder, an alumina source powder, a magnesia source powder and a silica source powder is fired.

The titania source powder to constitute the pre-mixture is a powder of a compound to be a titanium ingredient to constitute aluminium magnesium titanate; and the compound is, for example, titanium oxide. Titanium oxide includes, for example, titanium(IV) oxide, titanium(III) oxide, titanium (II) oxide, etc. Preferred is titanium(IV) oxide. The crystal type of titanium (IV) oxide includes an anatase type, a rutile type, a brookite type, etc., and may be amorphous. More preferred are an anatase type and a rutile type.

The titania source powder includes a powder of a compound to be led to titania (titanium oxide) by firing alone in air. The compound includes, for example, titanium salt, titanium alkoxide, titanium hydroxide, titanium nitride, titanium sulfide, titanium metal, etc.

The titanium salt concretely includes titanium trichloride, titanium tetrachloride, titanium(IV) sulfide, titanium(VI) sulfide, titanium(IV) sulfate, etc. The titanium alkoxide concretely includes titanium(IV) ethoxide, titanium(IV) methoxide, titanium(IV) t-butoxide, titanium(IV) isobutoxide, titanium(IV) n-propoxide, titanium(IV) tetraisopropoxide, and their chelate compounds, etc.

The titania source powder is preferably a powder of titanium oxide.

The alumina source powder is a powder of a compound to be an aluminium ingredient to constitute aluminium magnesium titanate, including, for example, a powder of alumina (aluminium oxide). The crystal type of alumina includes a γ type, a δ type, a θ type, an α type, etc., and may be amorphous. As the alumina, preferred is an α-type alumina.

The alumina source powder also includes a powder of a compound to be led to alumina by firing by alone in air. Such compound includes, for example, aluminium salt, aluminium alkoxide, aluminium hydroxide, aluminium metal, etc.

The aluminium salt may be an inorganic salt with an inorganic acid, or an organic salt with an organic acid. The aluminium inorganic salt concretely includes, for example, nitrates with aluminium such as aluminium nitrate, ammonium aluminium nitrate, etc.; and carbonates with aluminium such as ammonium aluminium carbonate, etc. The aluminium organic salt includes, for example, aluminium oxalate, aluminium acetate, aluminium stearate, aluminium lactate, aluminium laurate, etc.

Concretely, the aluminium alkoxide includes, for example, aluminium isopropoxide, aluminium ethoxide, aluminium sec-butoxide, aluminium tert-butoxide, etc.

The crystal type of aluminium hydroxide includes, for example, a gibbsite type, a bayerite type, a norstrandite type, a boehmite type, a pseudo-boehmite type, etc, and may be amorphous. Amorphous aluminium hydroxide includes, for example, an aluminium hydrolyzate to be obtained by hydrolysis of an aqueous solution of a water-soluble aluminium compound such as aluminium salt, aluminium alkoxide, etc.

The alumina source powder is preferably a powder of alumina.

The magnesia source powder is a powder of a compound to be a magnesium ingredient to constitute aluminium magnesium titanate. For example, mentioned is a powder of magnesia (magnesium oxide).

The magnesia source powder also includes a powder of a compound to be led to magnesia by firing alone in air. The compound includes, for example, magnesium salt, magnesium alkoxide, magnesium hydroxide, magnesium nitride, magnesium metal, etc.

The magnesium salt concretely includes magnesium chloride, magnesium perchlorate, magnesium phosphate, magnesium pyrophosphate, magnesium oxalate, magnesium nitrate, magnesium carbonate, magnesium acetate, magnesium sulfate, magnesium citrate, magnesium lactate, magnesium stearate, magnesium salicylate, magnesium myristate, magnesium gluconate, magnesium dimethacrylate, magnesium benzoate, etc.

The magnesium alkoxide concretely includes magnesium methoxide, magnesium ethoxide, etc.

As the magnesia source powder, further usable is a powder of a compound serving both as a magnesia source and an alumina source. The compound of the type includes, for example, magnesia spinel ($MgAl_2O_4$).

The amount to be used of the titania source powder, the alumina source powder and the magnesia source powder is described. In general, the amount of the titania source powder to be used, as titania, is from 20 parts by mass to 60 parts by mass, relative to the total, 100 parts by mass, of the amount of the titania source powder to be used as titania [$TiO_2$], the amount of the alumina source powder to be used as alumina [$Al_2O_3$] and the amount of the magnesia source powder to be used as magnesia [$MgO$] ; the amount of the alumina source powder to be used as alumina is from 30 parts by mass to 70 parts by mass; the amount of the magnesia source powder to be used as magnesia is from 0.1 parts by mass to 10 parts by mass; preferably, the amount of the titania source powder to be used as titania is from 30 parts by mass to 55 parts by mass (more preferably from 30 parts by mass to 50 parts by mass), the amount of the alumina source powder to be used as alumina is from 35 parts by mass to 60 parts by mass (more preferably from 40 parts by mass to 60 parts by mass), and the amount of the magnesia source powder to be used as magnesia is from 0.5 parts by mass to 10 parts by mass (more preferably from 0.5 parts by mass to 5 parts by mass).

The silica source powder is a powder of a compound to be in aluminium magnesium titanate as a silicon ingredient therein, and includes, for example, a powder of silicon oxide (silica) such as silicon dioxide, silicon monoxide, etc.

The silica source powder further includes a powder of a compound capable of being led to silica by firing alone in air. The compound includes, for example, silicic acid, silicon carbide, silicon nitride, silicon sulfide, silicon tetrachloride, silicon acetate, sodium silicate, sodium orthosilicate, glass frit, etc. Preferred are glass frit and the like, from the viewpoint of industrial availability.

As the silica source powder, also usable is a powder of a compound serving as an alumina source. Such compound includes, for example, feldspar. Feldspar includes alkali feldspar and calcium feldspar. Feldspar may be a natural substance or may be an industrially synthesized product.

The amount of the silica source powder to be used may be generally from 0.1 parts by mass to 20 parts by mass, relative to the total, 100 parts by mass, of the amount to be used of the particulate titania source, alumina source and magnesia source in terms of the total amount of titania, alumina and magnesia, preferably from 1 part by mass to 10 parts by mass.

The pre-mixture can be obtained, for example, by mixing a titania source powder, an alumina source powder, a magnesia source powder and a silica source powder. The mixing may be attained by dry process or by wet process. The order in mixing is not specifically defined; and a titania source powder, an alumina source powder, a magnesia source powder and a silica source powder may be mixed all at a time.

In general, a titania source powder, an alumina source powder, a magnesia source powder and a silica source powder may be mixed with stirring and grinding along with grinding media in a grinding container.

As the grinding container, in general, used is one formed of a metal material such as stainless steel or the like, and the inner surface thereof may be coated with a fluororesin, a silicone resin, an urethane resin or the like.

The grinding media include, for example, alumina beads, zirconia beads and the like having a diameter of from 1 mm to 100 mm, preferably from 5 mm to 50 mm.

The stirring maybe attained, for example, by vibrating and rotating the grinding container containing a titania source powder, an alumina source powder, a magnesia source powder, a silica source powder and grinding media. By vibrating and rotating the grinding container, the starting material powders are stirred and mixed along with the grinding media and are thereby ground. For vibrating or rotating the grinding container, for example, usable is an ordinary grinding machine such as a vibration mill, a ball mill, a planetary mill, a pin mill such as a high-speed rotating grinder or the like. From the viewpoint of industrial operation, a vibration mill is preferably used. The mixing may be attained by continuous process or by batch process; however, from the viewpoint of industrial operation, preferred is continuous process.

The time taken for the mixing is generally from 1 minute to 6 hours, preferably from 1.5 minutes to 2 hours.

In the grinding, additives such as a dispersant, a grinding aid, a deflocculant and the like may be added.

The grinding aid includes, for example, alcohols such as methanol, ethanol, propanol, etc.; glycols such as propylene glycol, polypropylene glycol, ethylene glycol, etc.; amines such as triethanolamine, etc.; higher fatty acids such as palmitic acid, stearic acid, oleic acid, etc.; carbon materials such as carbon black, graphite, etc. One or more of these may be used either singly or as combined.

In case where the additives are used, the total amount thereof to be used may be generally from 0.1 parts by mass to 10 parts by mass, relative to the toral, 100 parts by mass, of the amount of the starting materials to be used, or that is, the total amount of the titania source powder, the alumina source powder, the magnesia source powder and the silica source powder to be used, preferably from 0.5 parts by mass to 5 parts by mass, more preferably from 0.75 parts by mass to 2 parts by mass.

When the additives are used, the additives may be removed from the pre-mixture after the mixing. Regarding the removal of the additives, for example, when the additives can be burnt away by heating in air, then they may be burnt away by heating in air. The heating temperature is generally not higher than 500° C.

In that manner, a pre-mixture containing a titania source powder, an alumina source powder, a magnesia source powder and a silica source powder is obtained, and the pre-mixture can be led into aluminium magnesium titanate by firing.

The pre-mixture obtained as powdery from the titania source powder, the alumina source powder, the magnesia source powder and silica source powder may be heated to a temperature range of from 1100° C. to 1350° C., and the powder of the pre-mixture may be maintained within the temperature range; or, the pre-mixture may be shaped and the shaped body may be maintained within the temperature range. The method for shaping the pre-mixture is, for example, a method of pressing the mixture in a shaping mold using a uniaxial press, a tabletter or the like, or a method of adding a liquid component such as water to the pre-mixture, followed by shaping with a granulator, an extruder or the like and drying.

In the production process of the invention, the pre-mixture is maintained within a temperature range of from 1100° C. to 1350° C. for at least 3 hours, preferably for at least 4 hours, more preferably at least 6 hours, and generally at most 24 hours. While maintained within a temperature range of from 1100° C. to 1350° C., the pre-mixture may be maintained at a constant temperature, or may be gradually heated or gradually cooled or may be alternately and repeatedly heated and cooled, not overstepping the temperature range. In heating or cooling, the heating rate and the cooling rate may be generally at most 100° C./hr from the viewpoint that the pre-mixture can be maintained within the temperature range with ease, preferably at most 80° C./hr, more preferably at most 50° C./hr.

The atmosphere during heating the pre-mixture to the above-mentioned temperature range and maintaining the pre-mixture within the above-mentioned temperature range is generally in air; however, depending on the type and the amount to be used of the starting material powders, or that is, the titania source powder, the alumina source powder, the magnesia source powder and the silica source powder, the pre-mixture may be fired in an inert gas such as nitrogen gas, argon gas or the like, or may also be fired in a reducing gas such as carbon monoxide gas, hydrogen gas or the like. During the heating, the water vapor partial pressure in the atmosphere may be reduced.

In general, the heating is attained using an ordinary firing furnace such as a tubular electric furnace, a boxy electric furnace, a tunnel furnace, a far-IR furnace, a microwave heating furnace, a shaft furnace, a reverberating furnace, a rotary furnace, a roller hearth furnace, etc.

After maintained within the above-mentioned temperature range for at least 3 hours, the mixture may be heated up to a temperature of 1400° C. or more, usually lower than 1500° C., and fired at the temperature to give the intended aluminium magnesium titanate. The firing may be attained by maintaining the pre-mixture within the above-mentioned temperature range followed by heating up the pre-mixture to the above-mentioned temperature. The firing maybe attained in the same atmosphere as described above using the same heating furnace as described above.

The time to be taken for the firing may be a time enough for production of aluminium magnesium titanate from the pre-mixture, and may be generally from 10 minutes to 24 hours, and the time may vary depending on the amount of the pre-mixture, the type of the firing furnace, the firing temperature, the firing atmosphere and others.

In that manner, the intended aluminium magnesium titanate can be obtained as a fired product; and in case where the pre-mixture is fired as powdery, the product is obtained generally as massive; and in case where the pre-mixture is shaped and then fired, the product may keep almost the same form as the shaped body just after shaping.

The thus-obtained aluminium magnesium titanate is ground to give a powder of aluminium magnesium titanate. The grinding may be attained, for example, by hand, by using a mortar, or by using an ordinary grinding machine such as a ball mill, a vibration mill, a planetary mill, a media-assisted stirring mill, a pin mill, a jet mill, a hammer mill, a roll mill, etc. The aluminium magnesium titanate powder thus obtained by grinding may be classified in an ordinary method.

Aluminium magnesium titanate to be obtained as a shaped body includes, for example, tools for firing furnaces such as crucibles, setters, saggers, refractories, etc; filters and catalyst carriers for use for exhaust gas purification in internal combustion engines such as diesel engines, gasoline engines, etc.; electronic components such as parts of power generators, substrates, capacitors and others, etc.

EXAMPLES

The invention is described in detail with reference to the following Examples; however, the invention should not be limited by such Examples.

The coefficient of thermal expansion [$K^{-1}$] of aluminium magnesium titanate obtained in Examples was calculated as follows: A sample piece of about 4 mm×4 mm×12 mm was cut out of the shaped body of aluminium magnesium titanate obtained in Examples, and subjected to heat treatment of heating up to 600° C. at a heating rate of 200° C./hr and then immediately left cooled to room temperature; and calculating the coefficient of thermal expansion from the expansion date on heating sample from room temperature up to 1000° C. at a heating rate of 600° C./hr by using a thermomechanical analyzer [SII Technology's "TMA6300"].

The aluminium magnesium titanate conversion ratio [AMT conversion ratio] was calculated from the integrated intensity ($I_T$) of the peak [titania-rutile phase (110) face] at the position of 2θ=27.4° in a powder X-ray diffraction spectrum, and the integrated intensity ($I_{AMT}$) of the peak [aluminium magnesium titanate phase (230) face] at the position of 2θ=33.7°, according to the formula (1):

$$\text{AMT Conversion Ratio } (\%) = [I_{AMT}/(I_T + I_{AMT})] \times 100 \, (\%) \quad (1)$$

Example 1

A pre-mixture prepared by mixing 28.9 parts by mass of titanium(IV) oxide powder [DuPont, "R-900"], 36.9 parts by mass of α-alumina powder [Sumitomo Chemical's "AES-12"], 4 parts by mass of magnesia spinel powder and 2.6 parts by mass of feldspar powder [Fukushima feldspar having a silicon content as $SiO_2$ of 72% by mass and an aluminium content as $Al_2O_3$ of 15% by mass] was ground in a mortar; 3 g of the ground mixture was taken out, and shaped by pressing under a shaping pressure of 200 kgf/cm² (19.6 MPa) in a mold having an inner diameter of 20 mm using a uniaxial pressing machine, thereby giving a shaped body.

The shaped body was put into an alumina crucible, and fired in air in an electric furnace, by heating up to 1300° C. (in-furnace temperature) at a heating rate of 300° C./hr, then maintained at the temperature for 4 hours, further heated up to 1450° C. (in-furnace temperature) at a heating rate of 30 0° C./hr, maintained at the temperature for 4 hours, thereby giving an aluminium magnesium titanate shaped body. The coefficient of thermal expansion of the shaped body was 1.7 ×10⁻⁶ $K^{-1}$. The shaped body was ground, and the X-ray diffraction spectrum of the resulting aluminium magnesium titanate powder showed diffraction peaks corresponding to the aluminium magnesium titanate phase and the a-alumina phase. The spectrum did not show any other peak for crystal phase. The AMT conversion ratio derived from the X-ray diffraction spectrum was 100%.

Example 2

An aluminium magnesium titanate shaped body was produced in the same manner as in Example 1, except that, the heating time at 1300° C. was 8 hours. The coefficient of thermal expansion of the shaped body was 0.8×10⁻⁶ $K^{-1}$. The AMT conversion ratio of the aluminium magnesium titanate powder obtained by grinding the shaped body was 100%.

Comparative Example 1

An aluminium magnesium titanate shaped body was produced in the same manner as in Example 1, except that, the shaped body was heated up to 1300° C., and immediately further heated up to 1450° C., without maintaining the shaped body at the temperature of 1300° C. The coefficient of thermal expansion of the shaped body was $2.1 \times 10^{-6}$ K$^{-1}$. The AMT conversion ratio of the aluminium magnesium titanate powder obtained by grinding the shaped body was 100%.

Comparative Example 2

An aluminium magnesium titanate shaped body was produced in the same manner as in Example 1, except that, the shaped body was heated up to 900° C., then maintained at the temperature for 4 hours, and then further heated up to 1450° C. The coefficient of thermal expansion of the shaped body was $2.0 \times 10^{-6}$ K$^{-1}$. The AMT conversion ratio of the aluminium magnesium titanate powder obtained by grinding the shaped body was 100%.

Comparative Example 3

An aluminium magnesium titanate shaped body was produced in the same manner as in Example 1, except that, the body was, heated up to 1300° C., and immediately further heated up to 1450° C. and then maintained at the temperature for 24 hours, without maintaining the shaped body at the temperature of 1300° C. The coefficient of thermal expansion of the shaped body was $1.9 \times 10^{-6}$ K$^{-1}$. The AMT conversion ratio of the aluminium magnesium titanate powder obtained by grinding the shaped body was 100%.

INDUSTRIAL APPLICABILITY

Aluminium magnesium titanate obtained according to the production process of the invention is favorably used, for example, for tools for firing furnaces such as crucibles, setters, saggers, refractories, etc; filters and catalyst carriers for use for exhaust gas purification in internal combustion engines such as diesel engines, gasoline engines, etc.; electronic components such as parts of power generators, substrates, capacitors and others, etc.

The invention claimed is:

1. A process for producing an aluminum magnesium titanate powder, comprising maintaining a pre-mixture containing a titania source powder, an alumina source powder, a magnesia source powder and a powder of alkali feldspar within a temperature range of from 1100° C. to 1350° C. for at least 3 hours, followed by heating up a temperature not lower than 1400° C. and firing at the temperature to prepare an aluminum magnesium titanate, and grinding the resulting aluminum magnesium titanate.

* * * * *